UNITED STATES PATENT OFFICE.

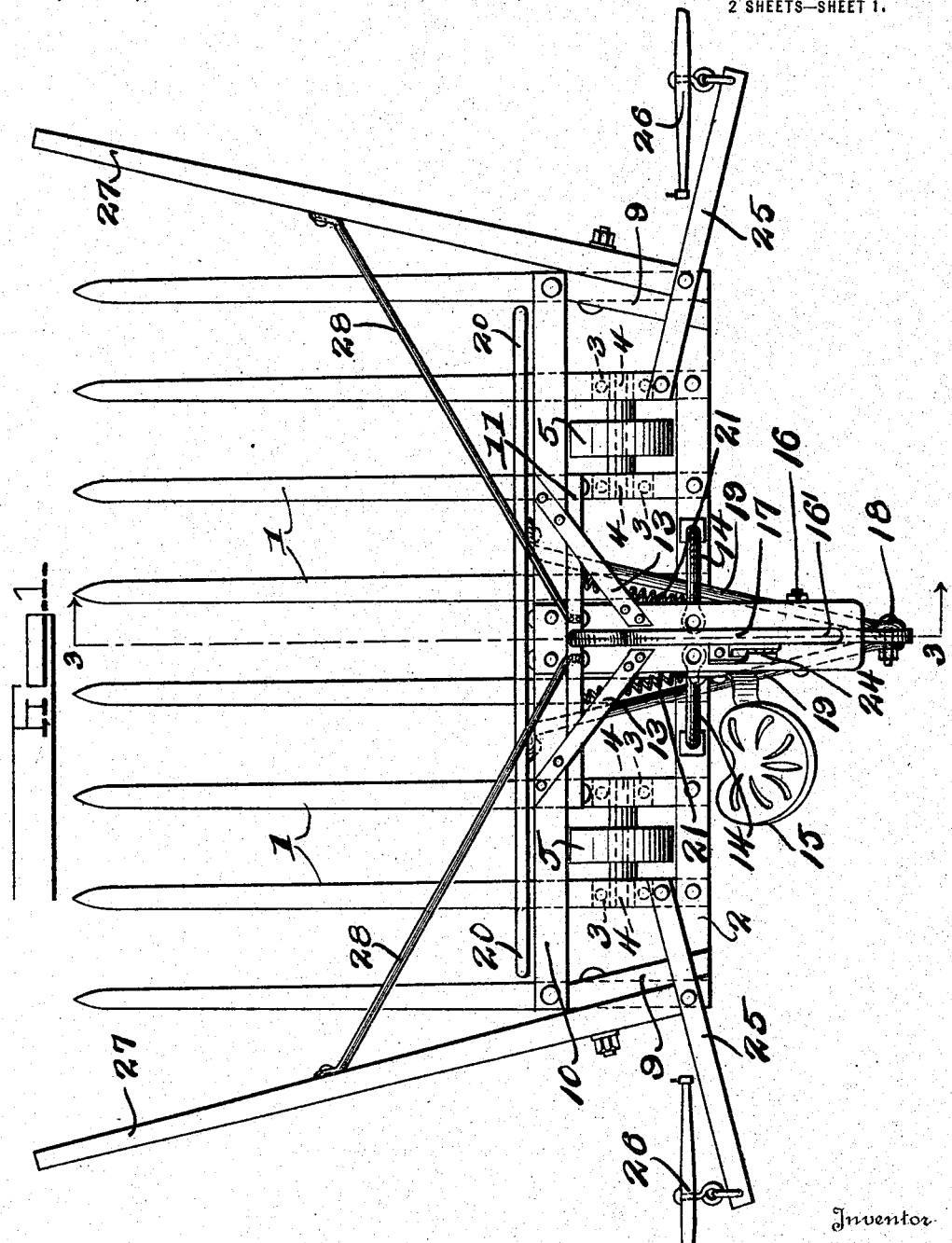

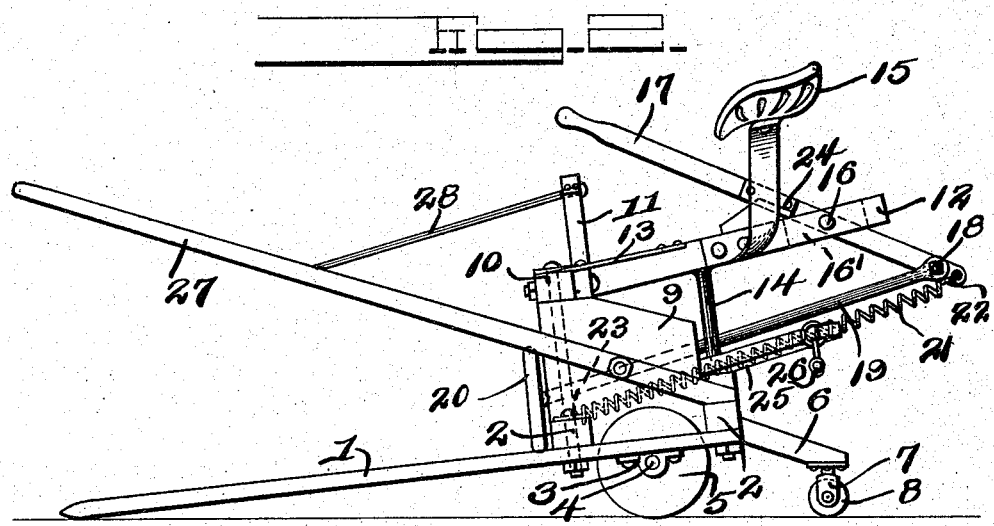
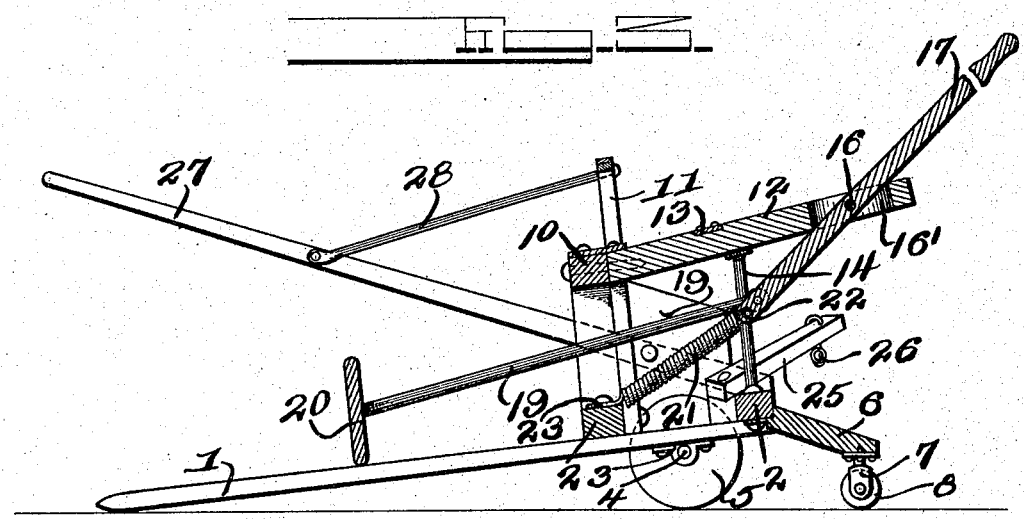

GEORGE SIMONSON, OF NEWMANS GROVE, NEBRASKA.

HAY-SWEEP.

1,188,210.   Specification of Letters Patent.   Patented June 20, 1916.

Application filed May 17, 1915. Serial No. 28,720.

*To all whom it may concern:*

Be it known that I, GEORGE SIMONSON, a citizen of the United States, residing at Newmans Grove, in the county of Madison and State of Nebraska, have invented certain new and useful Improvements in Hay-Sweeps, of which the following is a specification.

My invention relates to improvements in hay sweeps, and one object of the invention is the provision of an implement which can be easily drawn over the field to collect the hay and which will have novel and easily operated means for discharging the full load of hay from the sweep.

Another object is the provision of an agricultural implement of the character stated which will operate with ease and efficiency, which will be simple, strong and durable in construction, and in every respect practical.

To attain the desired objects my invention consists of a hay sweep embodying novel features of construction and arrangement of parts for service substantially as shown, described and particularly defined by the claims.

Figure 1 is a top plan view of a complete hay sweep constructed in accordance with and embodying my invention. Fig. 2 is a side elevation, and Fig. 3 is a sectional view of the implement taken on line 3—3 of Fig. 1.

Referring by numeral to the drawings in which similar numerals denote the same parts in the three views, the numeral 1 designates the teeth or tines of the sweep, connected at their inner ends by the pair of cross rails 2, and to certain pairs of the tines on their under faces are secured the bearing boxes 3, in which are mounted the short axles 4, of the ground wheels 5. Also from the rear of the outer rail 2, extends the arm 6, having mounted at its end the wheel bracket 7, in which is journaled the small rear or following ground wheel 8. From this construction it will be noted that the tines of the sweep are disposed at the proper incline and supported by the main and rear ground wheels and upon the pair of cross-pieces 2, at the sides are secured the pair of inclined strips 9, which at their upper ends are connected by the cross-rail 10, which rail is braced and retained by means of the angle-shaped vertical frame 11.

Extending rearward from the rail 10 is the inclined arm 12, which is retained by the pair of braces 13, leading from the arm 12 to the rail 10, and by the rods 14, extending from the said arm 12, to the outer rail 2, thus providing a rigid structure for supporting the cross-rail 10 and the arm 12.

Upon the arm 12 is supported the driver's seat 15, and fulcrumed at 16, in a slot 16' of the arm is the hand controlled lever 17. This lever is thus arranged convenient to the driver and near its lower end at 18, is secured the inner end of the rod 19, to whose outer end is secured the vertical board 20, which acts as a discharger to force the hay from the sweep. The board 20, extends practically across the tines and is forced outward by means of the spring 21, having one end 22, secured to the lower end of the hand lever and its other end 23, secured to the inner transverse rail 2, the hand lever and discharger being held in normal position as shown in Figs. 1 and 2 by means of the detent or dog 24, the spring 21 acting to throw the discharger 20 outward to discharge the load of hay from the tines.

From the rear of the implement extends the pair of lateral draft bars 25, to the ends of which are connected the swingle trees 26, and extending forwardly with reference to the draft bars and frame are the pair of tongues or poles 27, retained by the braces 28, and the horses are hitched to the swingle trees and tongues in the most desirable location for drawing the sweep over the ground. The sweep may be said to consist of the tines 1, the transverse main frame consisting of the pair of cross bars 2, to which the tines 1 are secured, the pair of vertical strips 9, and the cross piece 10, connecting said strips 9, the side draft connections 25, 26, the vertical frame comprising the angle-shaped frame 11, the inclined arm 12, pair of braces 13, and the pair of posts or supports 14, between arm 12 and one of the cross rails 2 and the spring actuated discharger mounted in the said vertical frame, and consisting of the hand lever 17, the rod 19 connected thereto at one end, the board 20, and the spring 21, secured to the lever 17 and to one of the rails 2. In operation the sweep is drawn over the ground and gathers the load of hay, the discharger being drawn inward to permit a full load to be collected, and as soon as the sweep has gathered the load of hay the driver releases the hand lever and the spring instantly moves the discharger outward throwing the entire load of hay from the tines. The driver then returns the hand lever to engagement with the detent and the sweep is ready for another operation.

In Figs. 1 and 2 the discharger is shown in the position it occupies before delivering the hay and in Fig. 3, the discharger is shown in the position it assumes when or after discharging the hay.

It will be seen that my implement is light in weight but strong and durable, can be easily drawn over the ground, and will operate rapidly, and effectively, can be readily managed or controlled and produced at a low price.

I claim:

1. A hay sweep, consisting of the main frame, the tines, the ground wheels, the draft connections at each side of the main frame, the vertical frame, the arm supported by said frame and formed with a slot, the hand lever fulcrumed in said slot, the detent for retaining said lever, the rod leading from said lever near its lower end, the vertical board forming the discharger connected to said rod, and the spring secured to the frame and lever for operating the discharger.

2. In a hay sweep, the combination with the tines and the main frame, the vertical frame, the arm supported by said frame, the hand lever fulcrumed in said arm, the detent for retaining the lever in normal position, the discharger connected with the frame and lever, and the spring for operating said discharger.

In testimony whereof I affix my signature in presence of two witnesses.

GEORGE SIMONSON.

Witnesses:
C. E. BARRETT,
E. H. GERHART.

Copies of this patent may be obtained for five cents each, by addressing the "Commissioner of Patents, Washington, D. C."